July 28, 1970   J. BARTON ET AL   3,521,650
BARREL-TYPE PROCESSING APPARATUS
Filed July 27, 1966   7 Sheets-Sheet 5
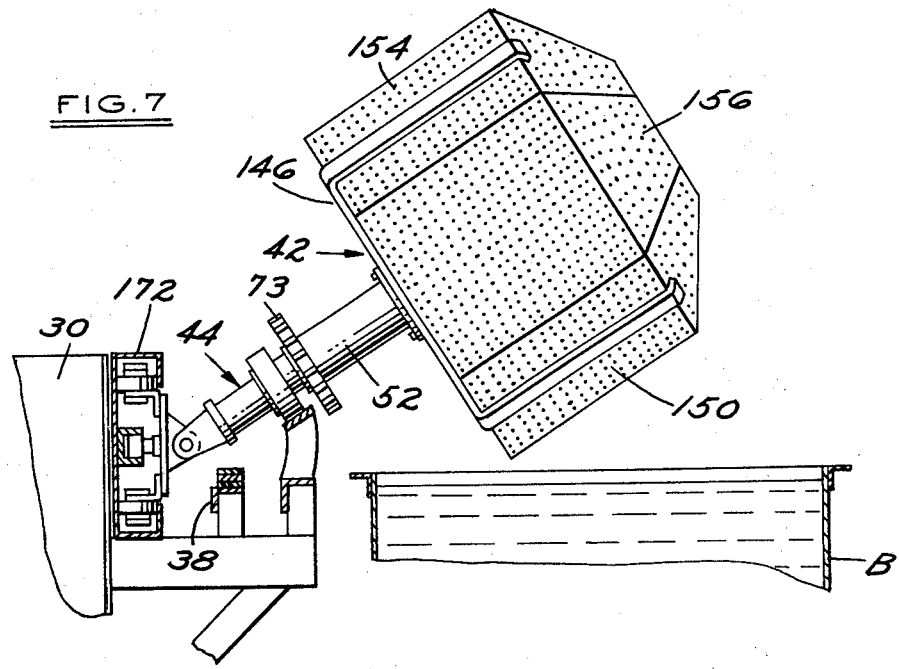
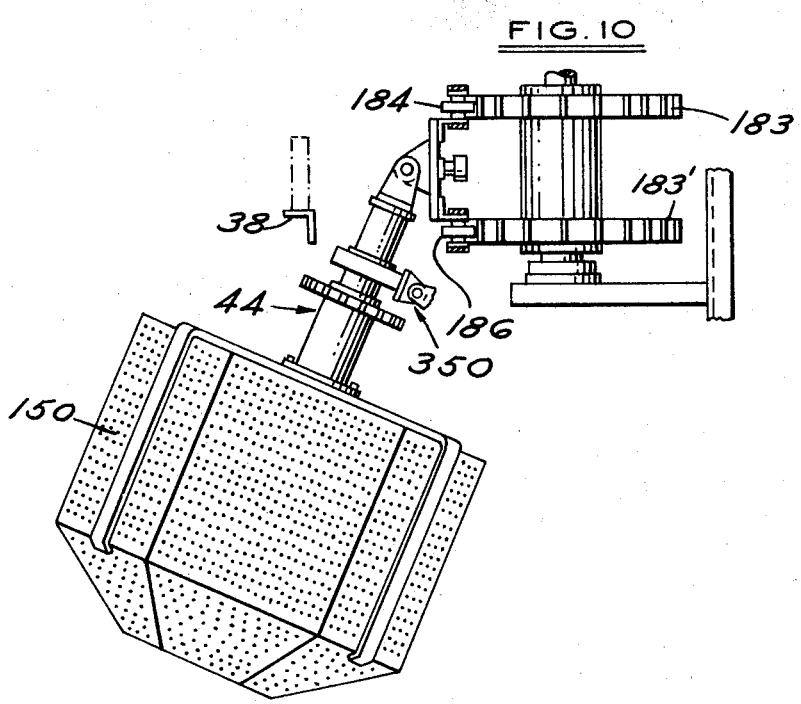
INVENTORS
JAMES BARTON
PATRICK H. NORTON
BY
Whittemore, Hulbert
& Belknap
ATTORNEYS

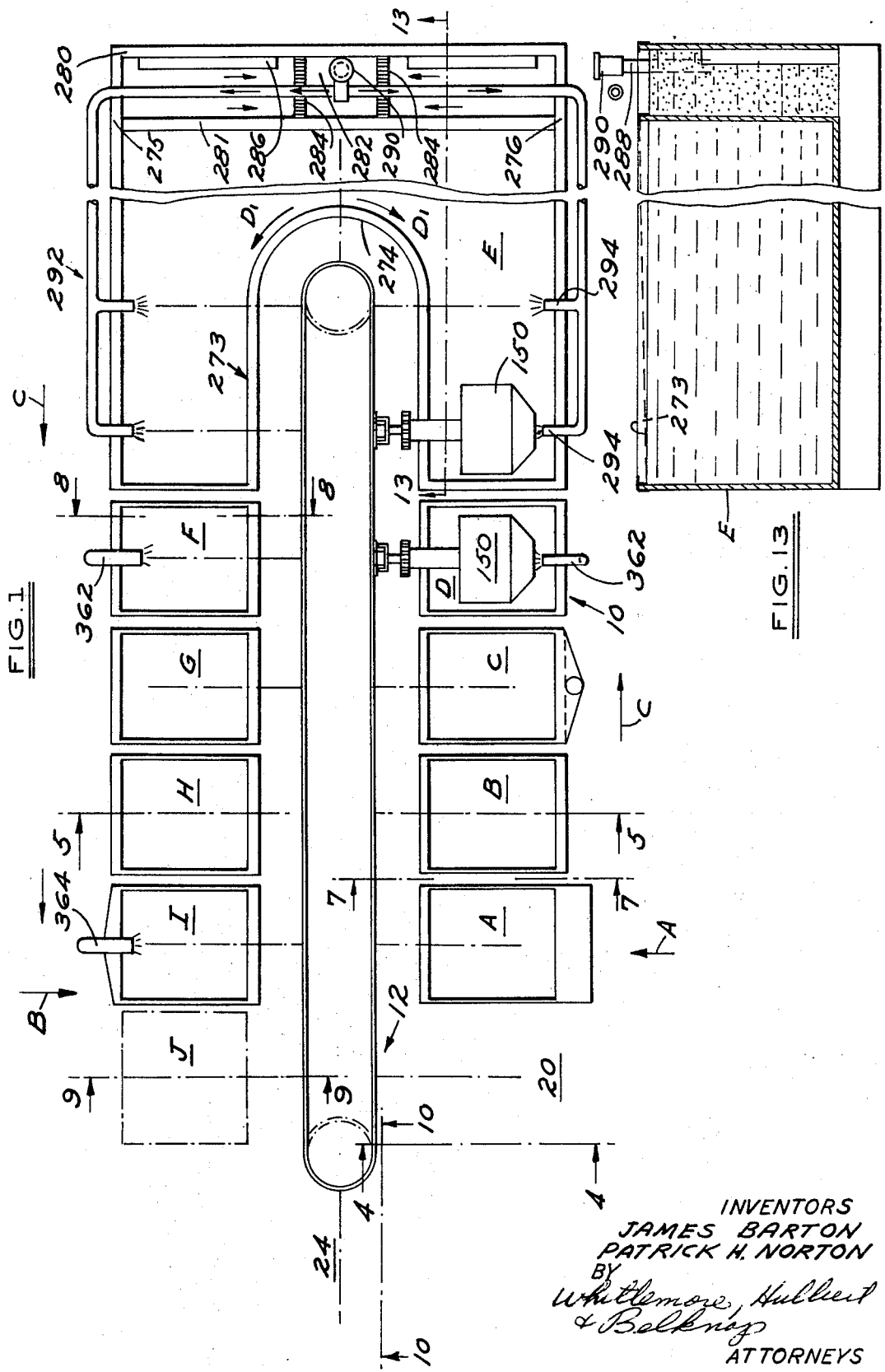

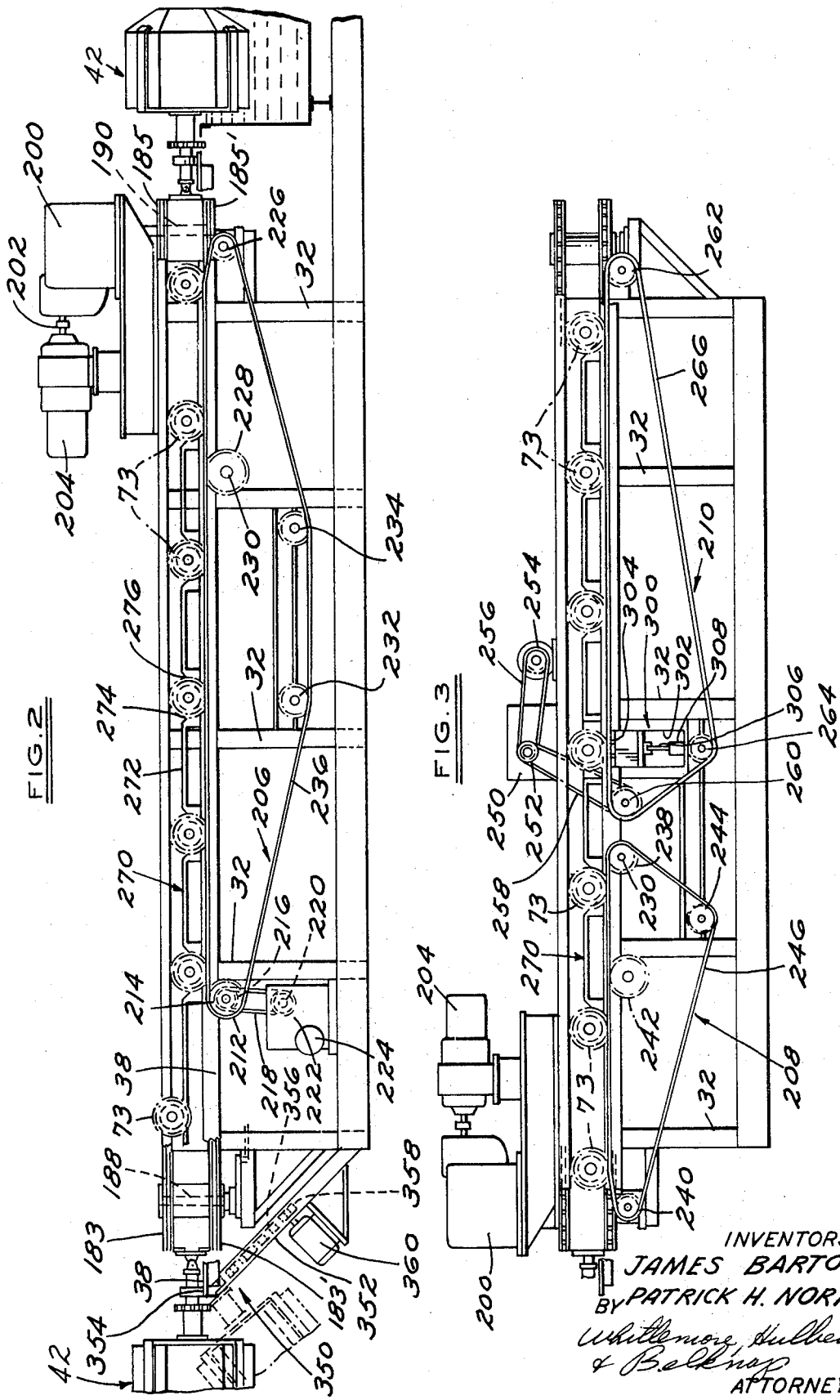

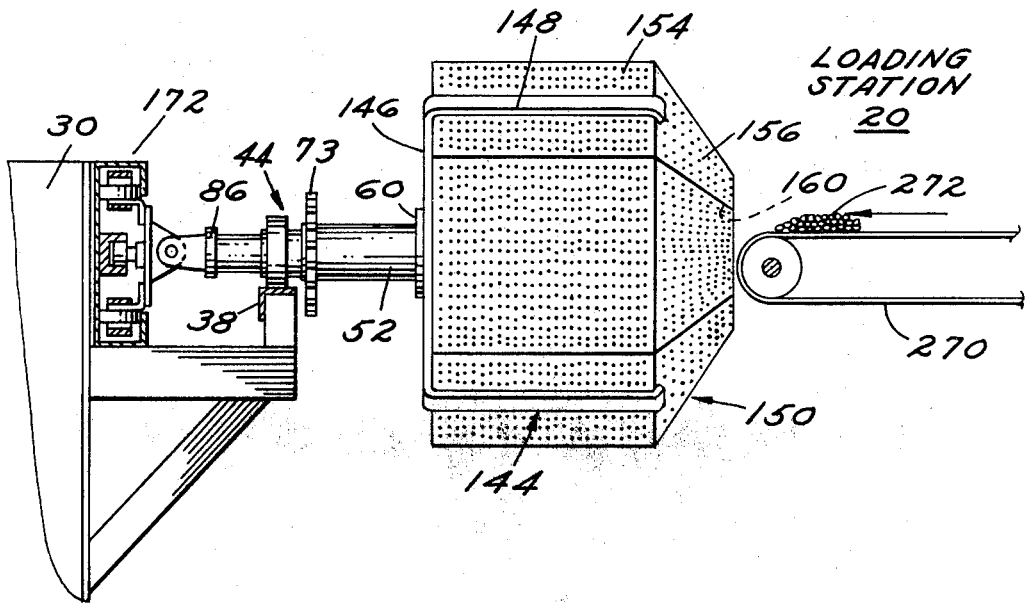
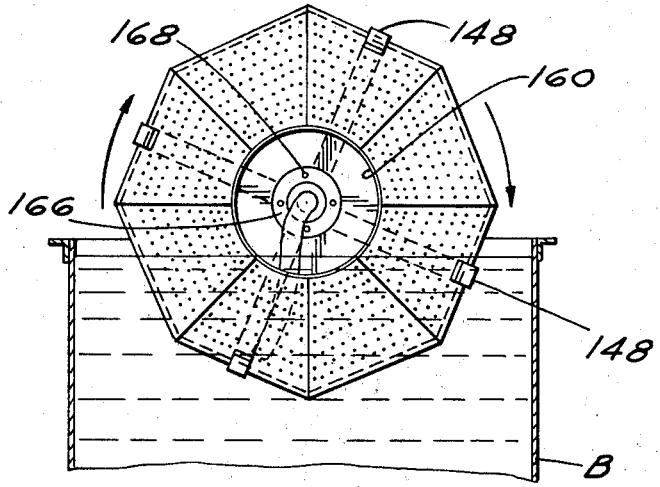

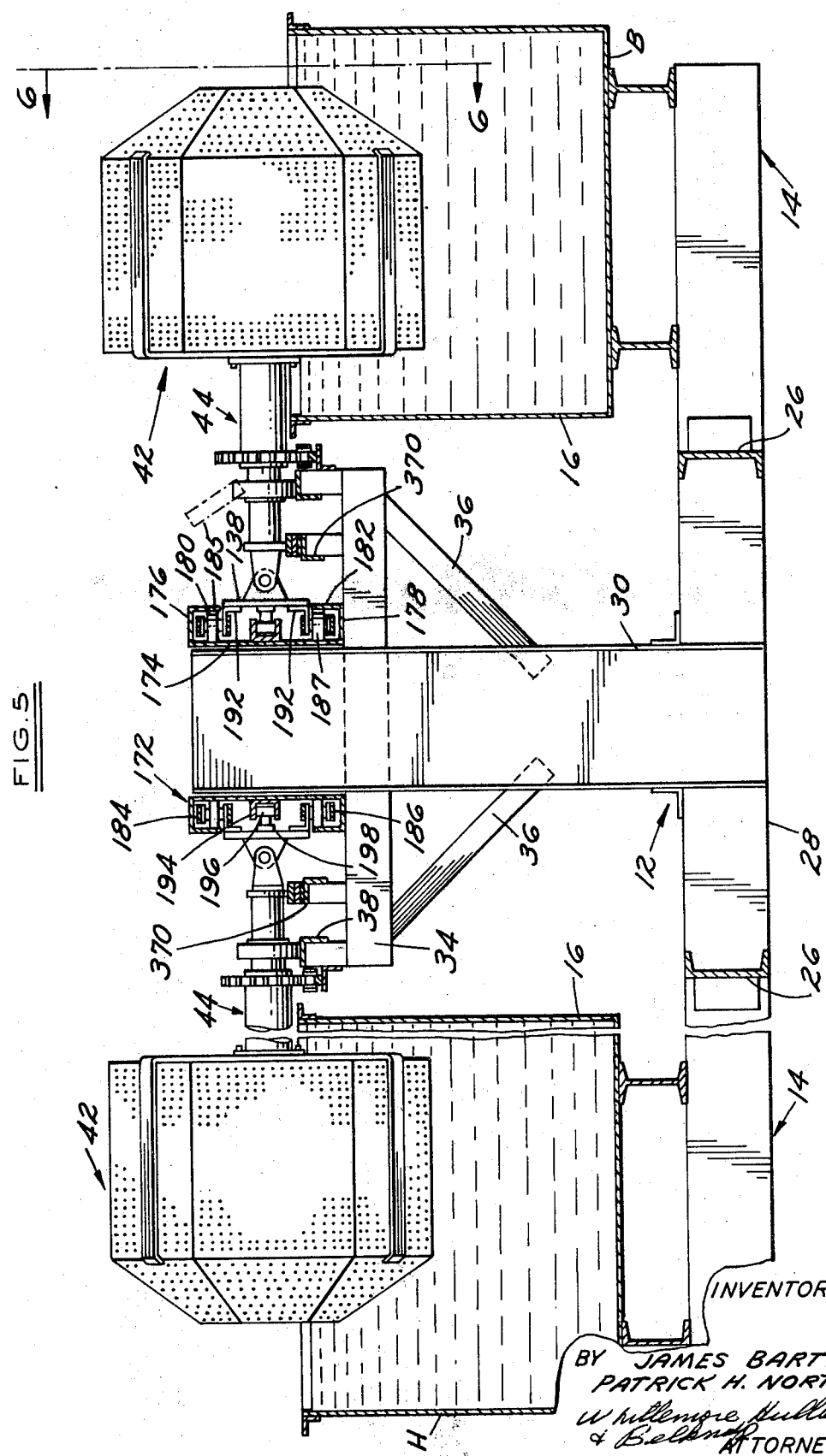

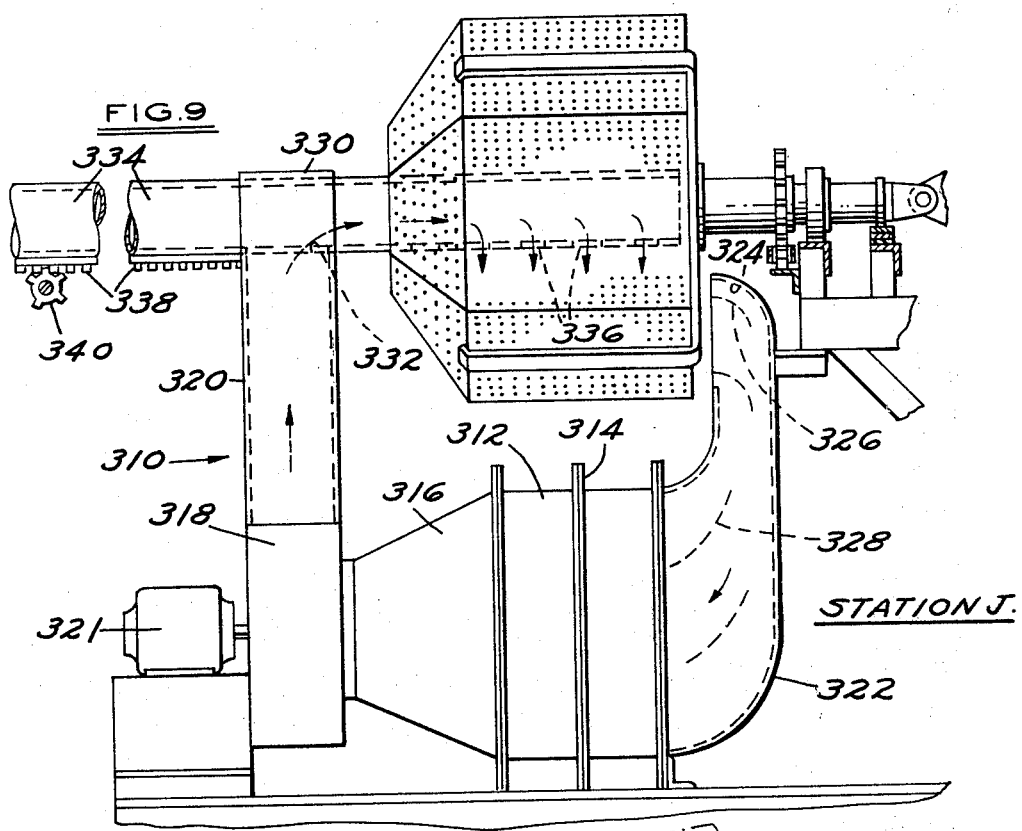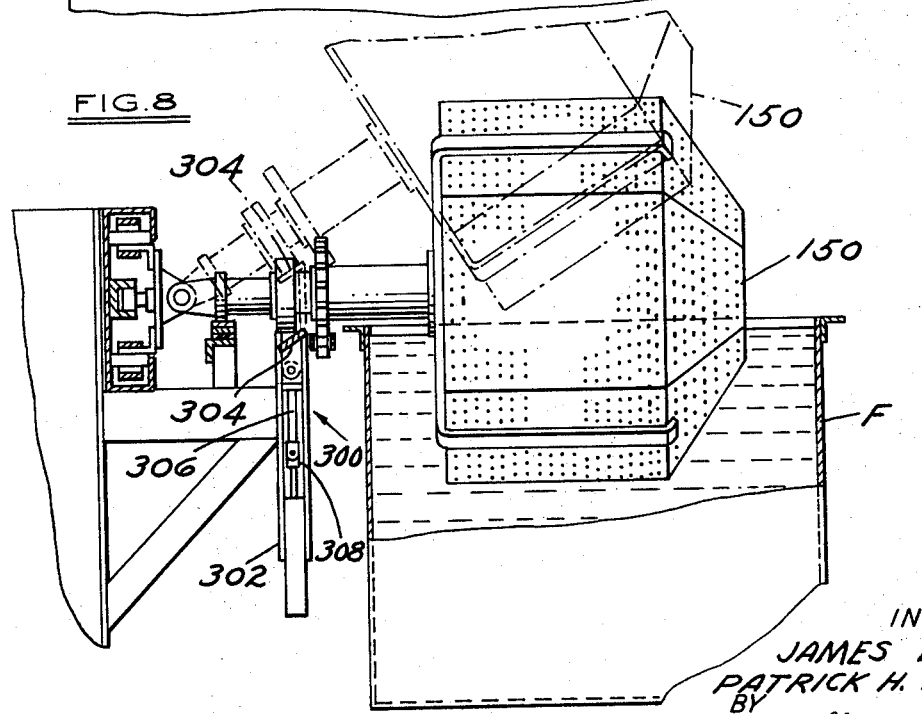

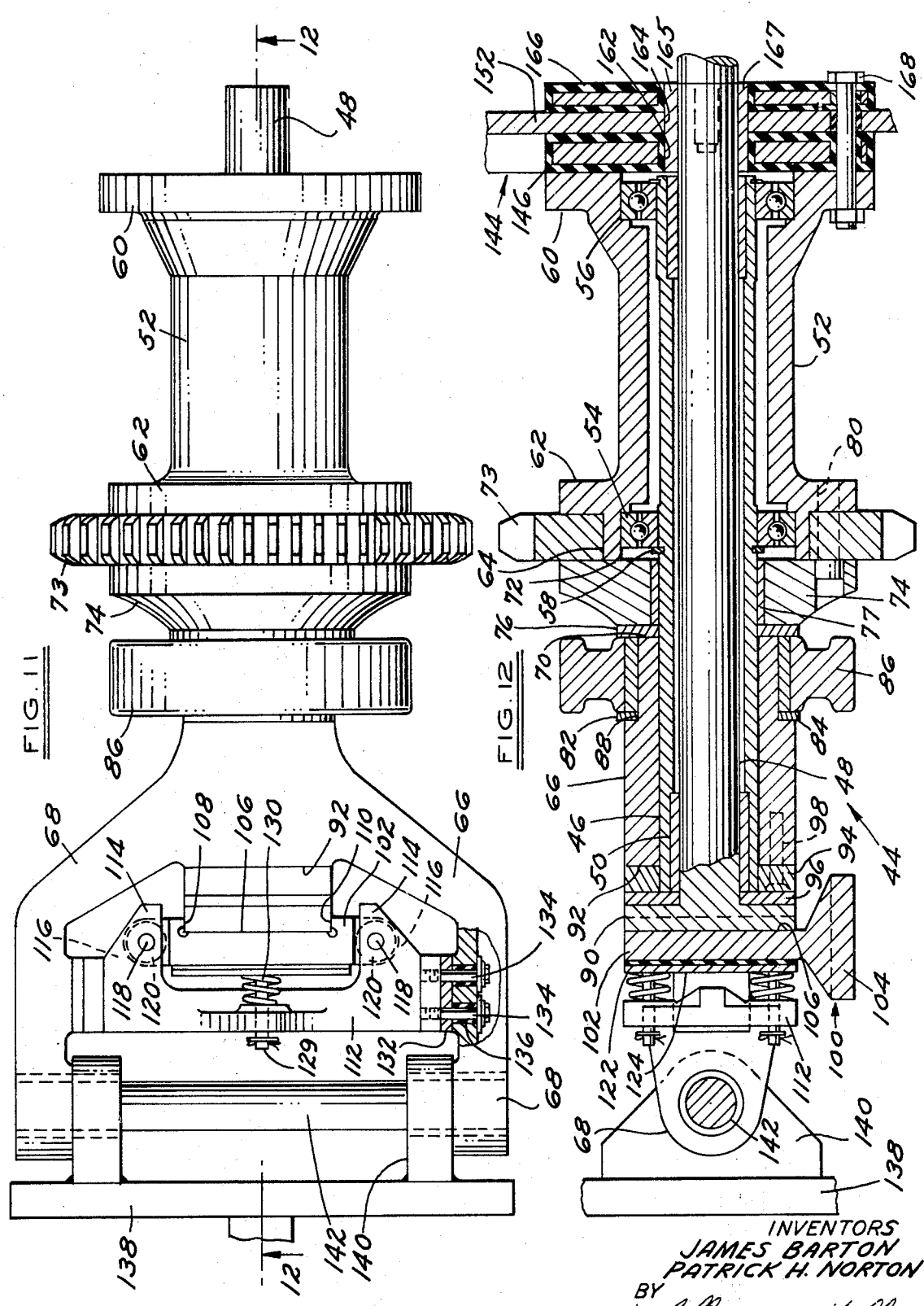

United States Patent Office 3,521,650
Patented July 28, 1970

3,521,650
BARREL-TYPE PROCESSING APPARATUS
James Barton, Grosse Pointe Woods, and Patrick H. Norton, Birmingham, Mich., assignors to Ionic International Inc., Lansing, Mich., a corporation of Michigan
Filed July 27, 1966, Ser. No. 568,287
Int. Cl. B05c 5/00
U.S. Cl. 134—70　　　　　　　　　　　　　　12 Claims

ABSTRACT OF THE DISCLOSURE

Automatic barrel-type plating and processing equipment is shown in which a plurality of traveling tumbling barrels have entrance openings facing outwardly of a frame supporting them. Each barrel is hollow, perforated and polygonal shaped, being closed at its bottom, and the barrels are mounted on the frame by lift arms having rotatable and non-rotatable housing portions through which a cathodic conductor extends. Thus the lift arm and barrel assembly may have a generally horizontal attitude when at a treating station and a loading station, the entrance opening of the barrel facing upwardly when the barrel moves from station to station. The opening faces downwardly when at the unloading station. Treating liquids enter the barrels through their openings at the treating stations. A trough directs expended treating solutions to an overflow tank provided with a sump and a pump connected to the sump for delivering the expended treating solution, after filtering and the temperature control, to the entrance opening of the barrel at the treating station. Reciprocatory snorkel type means are provided at one of the stations to direct a supply of heated air through the barrel opening directly onto the tumbling workpieces.

---

This invention relates to an automatic barrel plating and processing machine and equipment therefor, such machine being adapted for the bulk handling of small articles and for alternately tumbling, and then transferring a mass of small articles from one work station or position to another.

The present invention is concerned with the type of machine which is particularly useful for chemical and electrochemical treatment of small articles in bulk. Such machines are commonly referred to as barrel plating machines although their use is not restricted to electroplating processes. The prior art machines have been extensively employed in industry for automatically processing a variety of workpieces through a series of treating sequences which often include one or more electrochemical or electroplating steps. Such machines include an elongated central frame and means for mounting a plurality of receptacles or baskets (called barrels) in an inclined position for travel in a generally oval path around the frame from station to station. Means are also provided for intermittently driving the barrels around the frame, for swinging the barrels upwardly to clear obstructions as they pass through certain portions of their path, and means for rotating the barrels upon their own axes when they are in their lowered, inclined positions for tumbling workpieces supported therein.

The general arrangement of a typical machine of this type is illustrated in the patent to Albert H. Hannon No. 2,148,552 entitled "Barrel Plating Machine" and in the patent to James Barton No. 2,963,140 entitled "Barrel Type Conveyor Apparatus." The machine shown in the Hannon patent includes a central frame having tanks or other work stations arranged along both sides thereof in a generally oval pattern. A plurality of barrels are supported upon brackets which are mounted for sliding or rolling travel along a track fixed upon the frame. The barrels are rotatably mounted upon arms which are pivoted upon the brackets for vertically swinging movement with respect thereto. Thus the barrels may be rotated upon their own axes, advanced around the central frame, and swung upwardly for clearing obstructions or for unloading. Normally in machines of this type, the barrels are rotatably driven only when they are in their lowered and inclined positions. In the Hannon patent rotational drive of the barrels is accomplished by a pair of elongated worms mounted on opposite sides of the central frame adjacent to the tanks and arranged to be rotatably driven. Each barrel is provided with a worm wheel which engages one of the worms when the barrel is lowered into its opposite position to couple the barrel to the worm for the rotary drive of the barrel through its worm wheel.

The Barton patent illustrates a machine in which a continuous chain is trained around the complete path that the barrels travel on the machine, and each one of the barrels is provided with a specially shaped sprocket which engages the chain for rotational drive when the barrels are lowered into their inclined operative positions at the treating or work stations.

The Barton and Hannon machines just described are believed to be typical prior art processing machines. Each of the machines has certain operational and functional disadvantages due in part to the fact that all of the barrels have entrance openings which face the central frame thereby making it very difficult at times to load and unload the barrels. In addition an excessive amount of time is required for loading, unloading and transferring the barrels during the treating operations. As a result of the barrel construction, it is necessary that the lift arm assemblies on the machines to which the barrels are connected are inclined downwardly when in an operative position in the treating tanks as illustrated in the Hannon and Barton patents. In addition, each barrel has to be raised to a greater extent between the inclined downwardly extending operative position and the inclined upwardly extending raised and transfer position. Thus the specific location of the openings in the barrels of the aforementioned prior art machine require a complex, cumbersome and rather expensive structure to achieve the requisite lifting action of the barrels, such structure imposing unduly high stress and wear on the operating components of the machine.

The present processing apparatus incorporates many unique and novel features which overcome certain of the technical problems inherent in the prior art machines including the arrangement on the frame of a plurality of barrels having entrance openings facing outwardly of the frame in order to facilitate the loading and unloading of the barrels and the overall operation and functioning of the apparatus during the processing sequences. Such an apparatus is of simple and durable design and provides for a high degree of operating flexibility and versatility not heretofore known in barrel plating or processing machines.

The unique design and configuration of the barrel of the present invention, which has the entrance opening therein facing outwardly with respect to the frame of the processing machine, has many advantages. The barrel is in the form of a hollow perforated receptacle closed at the bottom, with the side and top walls thereof each being of polygonal configuration, specifically eight-sided, for imparting additional tumbling motion to the workpieces in the receptacle upon rotation thereof. Each barrel is mounted on the frame of the processing machine by means of a novel and unique lift arm, which is provided with rotatable and nonrotatable housing portions through which the cathodic conductor extends, whereby the lift arm and barrel assembly has a generally horizontal attitude when in the operative position at a treating station and when at the loading station to facilitate treating and loading of the workpieces respectively. The lift arm and barrel assembly is raised to an inclined attitude or position, with the entrance opening of the barrel facing upwardly when the barrel is moved from station to station. The lift arm and barrel assembly has an inclined downwardly extending attitude or position, with the entrance opening of the barrel facing downwardly when at the unloading station to permit the workpieces to be readily discharged therefrom.

The processing machine of the present invention further includes means for continuously injecting treating or processing solutions or rinse waters directly into the barrel at the treating stations due to the unique design of the barrels. As an example, a hot water or a cold water rinse may be injected at a treating station directly through the entrance opening of the barrel onto the workpieces as they are tumbling due to the rotation of the barrel. In other cases a treating solution may be injected at a treating station into the entrance opening of the rotating barrel onto the tumbling workpieces.

The present invention further includes a trough on one of the treating tanks which directs expended treating solutions to an overflow tank which is provided with a sump and conduit means including a pump connected to the sump for delivering the expended treating solution, generally after the solution has been filtered and the temperature thereof controlled, to the entrance opening of the barrel at the treating station.

In addition, means may be provided at one of the stations whereby a heated supply of air is directed through the barrel opening directly onto the tumbling workpieces. As an example, a reciprocating snorkel-type unit may be employed at the treating station which is moved automatically into the barrel through the entrance opening and directs the heated air onto the workpieces and which is withdrawn automatically to permit the barrel to be transferred to the next station.

It is an object of the present invention to provide an improved barrel processing machine, with each barrel having an entrance opening facing outwardly from the machine to facilitate loading, treating and unloading of the workpieces therein.

Another object of the present invention is to provide a processing apparatus comprising a frame, a plurality of work stations located adjacent the frame including a loading station, a treating station, and an unloading station, a work carrying barrel mounted on the frame, with the barrel having an entrance opening in the end remote from the frame, drive means for moving the barrel along the frame through the stations, said barrel having a generally horizontal operative position at the treating station with the opening facing outwardly from the frame and an inclined transfer position between the stations with the opening facing in a generally upward direction, means for raising the barrel from the operative position to the transfer position during movement of the barrel between the stations, and means for rotating the barrel when in the operative position at the treating station.

Another object of the present invention is to provide a processing apparatus of the aforementioned type wherein means is provided for mounting the barrel in an inclined unloading position at the unloading station with the opening in the barrel facing in a generally downward direction.

Still another object of the present invention is to provide a processing apparatus of the aforementioned type wherein means is provided for mounting the barrel in a generally horizontal loading position at the loading station with the opening in the barrel facing outwardly from the frame.

A further object of the present invention is to provide a processing apparatus of the aforementioned type wherein fluid delivery means is provided for injecting a treating solution into the barrel through the opening when the barrel is in the operative position at the treating station.

A still further object of the present invention is to provide a processing apparatus of the aforementioned type wherein the fluid delivery means includes an overflow sump for collecting expending treating solution, conduit means interposed between the sump and the treating station, and a pump interposed in the conduit means.

Another object of the present invention is to provide a processing apparatus of the aforementioned type wherein the treating station includes a generally U-shaped tank extending around one end of the frame, a trough in the upper part of the tank, an overflow tank adjacent a side of the U-shaped tank, said trough sloping gradually downwardly in opposite directions towards the overflow tank to which the ends of the trough are connected, a sump in the overflow tank in which the overflow treating solution drains, a pump connected to the sump, and a delivery conduit connected to the pump, the conduit having a discharge spout located above the U-shaped tank for injecting the treating solution transferred from the sump by the pump and conduit into the barrel.

Still another object of the present invention is to provide a workpiece holder or barrel of the type which is adapted for use on a processing machine, with the holder comprising a hollow perforated receptacle having an opening in the top wall, a closed bottom and side and top walls of polygonal configuration for imparting additional tumbling motion to the workpieces in the receptacle upon rotation thereof.

A further object of the present invention is to provide a lift arm assembly for a processing machine of relatively inexpensive construction and of a unique design and configuration, such lift arm assembly being provided with rotatable and nonrotatable housing portions through which the cathodic conductor extends.

A still further object of the present invention is to provide a processing machine having a reciprocating snorkel-type heating unit which is moved automatically into a barrel at a treating station and directs heated air on the workpieces in the barrel and which is withdrawn automatically from the barrel to permit the barrel to be transferred to the next station.

It is thus another object of this invention to provide a simplified low cost structure of the aforementioned type having certain advantages contributing to efficiency, reliability and long life as well as ease of maintenance.

Further objects and advantages of the present invention will be apparent from the following description, reference being had to the accompanying drawings wherein a preferred form of the present invention is clearly shown.

FIG. 1 is a schematic plan view of the barrel processing apparatus incorporating the preferred embodiments of the present invention and illustrating a typical arrangement of treating receptacles or tanks disposed around the apparatus.

FIG. 2 is a side elevational view of the barrel processing machine looking in the direction of arrow A.

FIG. 3 is a side elevational view of the barrel processing machine looking in the direction of arrow B.

FIG. 4 is a transverse vertical view taken on the line 4—4 of FIG. 1 and illustrating one of the barrels of the apparatus in a loading position.

FIG. 5 is a transverse vertical sectional view taken on the line 5—5 of FIG. 1 and illustrating the barrels in an operative position at the treating stations.

FIG. 6 is an end view of a barrel and a tank taken on the line 6—6 of FIG. 5.

FIG. 7 is a transverse sectional view taken on the line 7—7 of FIG. 1 and illustrating a barrel in an elevated transfer position ready to move to the next station.

FIG. 8 is a transverse view taken on the line 8—8 of FIG. 1 and illustrating a barrel in solid lines in an operative position, and in dotted lines in an elevated transfer position.

FIG. 9 is a transverse vertical view taken on the line 9—9 of FIG. 1, and illustrating a reciprocating snorkel-type heating unit in a barrel at the drying station for directing heated air onto the workpieces in the barrel.

FIG. 10 is a fragmentary side view of a barrel and associated conveyor mechanism taken on the line 10—10 of FIG. 1.

FIG. 11 is a plan view of a carrier or lift arm assembly and the mounting therefor.

FIG. 2 is a vertical sectional view taken on the line 12—12 of FIG. 11.

FIG. 13 is a fragmentary side view, in section, taken on the line 13—13 of FIG. 1.

Referring now to the drawings, and as may best be illustrated in FIGS. 1-3, inclusive and FIG. 5, the barrel processing machine or apparatus is designated by the numeral 10. The apparatus 10 comprises an elongated central frame 12 around which is located an elongated outer frame 14 for supporting a series of aligned treating receptacles or tanks 16.

The specific barrel processing apparatus 10 is of the turn-around type wherein the travel of the workpieces is in a closed loop pattern commencing at the loading station generally indicated by the numeral 20 in FIG. 1 through a series of treating tanks 16 in a counterclockwise direction as indicated by the arrows C (FIG. 1) and terminating at an unloading station 24 adjacent to the loading station 20 as viewed in FIG. 1. It will of course be appreciated by those skilled in the art that the specific embodiments of this invention are equally applicable to conveying machines of the straight-through type wherein the workpieces are loaded at one end of the machine and are conveyed therealong through the treating receptacles and unloaded at the other end thereof.

The elongated central frame 12 comprises a pair of longitudinally extending base channels 26 connected to each other by a series of transverse base channels 28 at the ends and at intermediate points thereof in order to provide a rigid supporting base platform. The central frame 12 further includes a series of longitudinally spaced centrally located upright columns 30 which are rigidly affixed at their lower ends to the transverse base channels 28 and a pair of rows of longitudinally spaced upright support members 32 which are rigidly affixed at their lower ends to the base channels 28. One row of support members 32 is located on each side of the central row of base channels 28. Each column 30 is transversely aligned with a pair of support members 32, with the upper ends of such column and members 32 connected by a transversely extending support beam 34 which has the ends thereof connected to column 30 by braces 36.

A continuous work supporting angle or rail 38 is rigidly affixed, as an example, to the support beams 34, support members 32 and to other structural frame members. The rail 38 extends in a continuous loop around the entire central frame 12 and comprises a pair of straight rail sections 40 extending along the straight side portions of the central frame 12 and a pair of semi-circular arcuate turn around rail sections, not shown, connected to the rail sections 40 and extending around the end portions of the frame 12.

A plurality of workpiece holder and barrel assemblies 42 are mounted on lift or carry arm assemblies 44, the latter assemblies 44 being attached to conveyor means provided on the central frame 12 for moving the barrel assemblies 42 in a generally oval path around the frame 12.

The lift arm assembly 44 as best illustrated in FIGS. 11 and 12 comprises an elongated tubular sleeve 46, as an example, made from steel and a cathodic or electrical conductor 48, as an example, made from copper coaxially mounted in the interior of the sleeve 46 and separated therefrom by means of a pair of insulators or insulating bushings 50 provided at opposite ends of the sleeve 46 as best illustrated in FIG. 12. The bushings 50 are made, as an example, from nylon. The lift arm assembly 44 further includes on the front end portion of the sleeve 46 an external tubular housing 52 which is coaxially mounted with respect to the sleeve 46 and is spaced therefrom. A pair of roller or ball bearings 54 are located in the space between the housing 52 and the sleeve 46 and mounts the housing 52 for rotation. The annular bearings 54 are held in place by means of internal shoulders 56 provided in the housing 52 and by means of snap rings 58 carried by the sleeve 46 and adapted to hold the bearings 54 against the shoulders 56 as best illustrated in FIG. 12. The housing 52 includes a front mounting flange 60, a rear mounting flange 62, and an annular mounting ring 64 extending rearwardly from the flange 62.

The lift arm assembly 44 further includes a nonrotatable housing 66 which is coaxially mounted with respect to the sleeve 46. The housing 66 is U-shaped and in the form of a yoke having a pair of laterally spaced arms or brackets 68. The forward or front end surface 70 of the yoke 66 is spaced from the rear end surface 72 provided on the rotatable housing 52. A drive sprocket 73 is fixedly mounted on the annular mounting ring 64 and is held against the rear surface of mounting flange 62 and is adapted to rotate housing 52. A spacing element 74 and thrust washer 76 are located between the housings 52 and 56. The spacer 74 is provided with an internal bushing 77 which engages the sleeve 46. A plurality of radially spaced fastening elements or pins 85 extend through the spacer 74, sprocket 73 and flange 62 for securing same together as a rotatable unit.

The forward or front end of the yoke 66 is provided on the outer periphery thereof with an annular recess 82 in which is mounted an annular bearing element 84 carrying a cam ring or wheel 86. The bearing 84 and ring 86 are fixedly held in place on the yoke 46 by means of a snap ring 88 and the thrust washer 76 heretofore described.

The trailing end of the conductor 48 is provided with a flange 90 which is spaced from the centrally located yoke surface 92 by an annular ring member 94 and by a spacer or washer 96. The ring member 94 is carried by the sleeve 46 and is secured thereto by a plurality of fastening devices 98. The conductor 48 is insulated from yoke 66 by means of the spacer 96.

An electrical contact shoe 100 is provided which includes an upstanding flange 102 terminating on the lower end thereof in an enlarged base or shoe portion 104. The front side of the flange is provided with a depressed surface 106 extending the full length thereof and terminating laterally in edges or surfaces 108 and 110. The flange 90 of the conductor fits into the depression of the shoe 100, with the surfaces thereon in electrical contact with surfaces 106, 108 and 110 provided on shoe 100 as best illustrated in FIG. 11.

The yoke 66 further includes a saddle 112 extending transversely between the arms 68. The saddle 112 includes a pair of mounting lugs 114 which overlie a pair of lugs 116 provided on the contact shoe 100. The contact shoe 100 is connected to the saddle 112 of yoke 66 by means of a pair of pins 118 extending through the openings in the corresponding lugs 114 and 116.

Interposed between each of the opposing lugs 114 and 116 is resilient means 120 in the form of a coil spring effective to urge or bias the contact shoe 100 downwardly into engagement with the cathode rail as will be subsequently described. The resilient means 120 maintains electrical contact between the rail and shoe 100 and compensates for any wear or warpage in the rail. In order to permit the shoe 100 to slide vertically a bearing 122 made, as an example, from Teflon is provided between the back side of the shoe flange 102 and a movable pressure or back-up plate 124.

Resilient means are provided for urging the back-up plate 124, bearing 122 and shoe 100 toward the conductor 48, such means taking the form, as an example, of a pair of coiled springs 130 interposed between the saddle 112 and the back-up plate 124. The saddle 112 is provided with a pair of centrally located upper and lower rods or spring guides 129 around which the biasing springs 130 are located as best illustrated in FIG. 11.

Thus the contact shoe 100 is resiliently mounted on the saddle 112 for movement horizontally as well as vertically to insure effective electrical contact at all times.

An insulating spacer or element 132 is interposed between each yoke arm 68 and the corresponding end of saddle 112. A pair of fastening devices 134 secured each arm 68, spacer 132 and the saddle 112 together. The fastening devices 134 each include a threaded bolt, washer, nut and an insulating bushing 136 insulating the yoke 66.

The arms or brackets 68 are pivotally connected to a conveyor driven movable bracket or carriage 138. The carriage 138 has a pair of lugs 140 with openings corresponding to the openings in brackets 68. A pivot shaft 142 extends through the openings in lugs 140 and brackets 68 thereby pivotally mounting the lift arm assembly 44 as will be described later.

It should be appreciated that the electrical current carrying parts of the lift arm assembly 44 are suitably insulated from the other parts thereof for safety purposes.

The workpiece holder and bracket assembly 42 is mounted on the forward or front end of the lift arm assembly 42 and is provided with a generally centrally located axis which is coincidental with the axis of the lift arm assembly 44. The bracket 144 of the assembly 42 includes a base 146 through which the axis extends. Attached to the base 146 are a plurality of elongated arms 148, each arm 148 being secured on the same end to the base 146 at spaced points thereon. The arms 148 extend forwardly from the base 146 and are arranged generally parallel to the axis of the assembly 42. A hollow perforated receptacle or basket 150 is carried by the bracket 144 as illustrated in the drawings. The receptacle 150 is provided with a closed bottom or bottom wall 152 and includes a side wall 154 and a top wall 156. The side and top walls are each of polygonal configuration. Specifically, the side wall 154 of the receptacle is of octagonal configuration. The top wall 156 of the receptacle is also of octagonal configuration with the ends or edges of the eight top sections surrounding a generally centrally located relatively large opening 160 through which the workpieces to be treated are introduced into the receptacle 150. The base 146 is provided with a centrally located opening 162. The bottom wall 152 is provided with a centrally located opening 164 in which is fixedly located a tubular element 165. The element 165 extends through the opening 162 in the base 146 and through the opening 167 in the disc 166 located on the interior of the receptacle against the bottom wall 152. The disc 166, base 146 and bottom wall 152 are insulated or made from non-conducting materials. A plurality of radially spaced fastening means 168 such as threaded nuts and bolts are provided for securing the disc 166, bottom wall 152 of the receptacle 150, the base 146 of the bracket 144 to the mounting flange 60 procided on housing 52. The top and side walls 156 and 154 respectively, and in some cases the bottom wall 152, of the receptacle 150 are perforated on all the surfaces thereof to permit treating solutions injected into the receptacle during the processing operations to escape. Each perforation has a diameter of approximately $9/32''$. The perforations are arranged in a relatively close pattern so as to substantially cover all surfaces of the receptacle 150. The polygonal configuration of the top and side walls of the receptacle 150 help to add or to impart additional tumbling motion to the workpieces in the receptacle 150 upon rotation thereof. The receptacle, as an example, is made from polypropylene having a thickness of $3/8''$.

Each side of the central frame 12 is provided with a longitudinally extending channel-shaped member 172 fixedly mounted on the cross members or supports 34. Each member 172 includes a vertical back wall 174, upper and lower horizontally extending flanges 176 and 178 respectively and inwardly turned upper and lower vertical flanges 180 and 182 respectively which are spaced laterally from the back wall 174. The channel members 172 extend substantially the entire length of the frame 12, one member 172 on each side of the frame 12 as best illustrated in FIG. 5.

The upper part of each member 172 including flanges 176 and 180 forms an upper chain guide or track while the lower part of each member 172 including flanges 178 and 182 forms a lower chain guide or track. An upper continuous or endless link chain or conveyor 184 is located in the upper chain guide aforesaid and extends around the central frame 12 and is supported at the arcuate turn around portions of the apparatus 10 by an upper idler sprocket 183 at one end of the apparatus 10 and by an upper drive sprocket 185 at the other end of the apparatus 10. The chain or conveyor 184 consists of a series of pivotally connected upper and lower links which have interposed therebetween a continuous series of closely spaced upper guide rollers 185 which engage opposing vertical surfaces of the upper guide tracks aforesaid as the chain 184 traverses the frame 12. The purpose of the guide rollers 185 is to provide lateral stability for the conveyor chain 184 as it moves about the periphery of the frame 12.

A lower continuous or endless link chain or conveyor 186, similarly constructed as the conveyor 184, is located in the lower chain guide aforesaid and extends around the central frame 12 and is supported by a lower idler sprocket 183' and by a lower drive sprocket 185'. The chain or conveyor 186 consists of a plurality of interconnected upper and lower links having interposed therebetween a continuous series of closely spaced lower guide rollers 187. The guide rollers 187 are adapted to engage the vertical surfaces of the lower guide tracks aforesaid as the conveyor or chain 186 moves about the periphery of the frame 12 in synchronous movement with the chain or conveyor 184.

The idler sprockets 183 and 183' are rotatably mounted on a shaft 188 at one end of the frame 12 while the drive sprockets 185 and 185' are rotatably mounted on a shaft 190 at the other end of the apparatus 10. Each pair of sprockets is rotatably mounted at substantially the center of curvature of the corresponding turn around section of the apparatus 10. One pair of sprockets, as an example, the idler sprockets 183 and 183', may be mounted for longitudinal movement with respect to the frame 12 by a take-up device, not shown, which provides adjustment of the tension of the drive chains or conveyors 184 and 186.

The movable carriage or bracket 138 for each lift arm and barrel assembly 44 is connected to the upper and lower drive conveyor or chains 184 and 186 for movement thereby by means of a pair of upper and lower elongated angle-shaped mounting lugs 192. The mounting lugs 190 have their vertical legs secured to the bracket or carriage 138 and their horizontal legs interposed and secured to a pair of adjacent links of the corresponding conveyor chain 184 or 186 as best illustrated in FIG. 5. An elongated U-shaped track 194 extends the entire length of each of the channel-shaped members 172. The track 194 is located at the center of the member 172 adjacent back wall 174 thereof. The back side of each bracket 138 is provided with a pair of rollers 196 mounted on shafts 198 carried by the bracket 138. As each carriage 138 and the supported lift arm and barrel assembly 44 moves about the periphery of the frame 12, the guide rollers 196 provide for and maintain vertical alignment as will appear by referring to FIG. 5. It should be understood that the U-shaped track 194 may be made in several pieces or elements as is well known to a person skilled in the art.

The drive shaft 190 for the upper and lower drive sprockets 185 and 185' respectively is rotatably coupled to a vertical shaft, not shown, on the speed reducer 200. The reducer 200 is in turn drivingly coupled by a flexible coupling 202 to an electric drive motor 204. By this arrangement the lift arm and barrel assemblies 44 are simultaneously and intermittently advanced along the supporting rail 38 of the endless frame 12 in increments corresponding to the distance between adjacent treating stations.

The near side of the apparatus 10 is provided with a first rotatable barrel chain drive 206 as illustrated in FIG. 2. The far side of the apparatus 10 as illustrated in FIG. 3 is provided with a second barrel chain drive 208 and a third rotatable barrel chain drive 210. The aforementioned barrel chain drives are for the purpose of rotating the barrels 42 at preselected work stations at predetermined speeds.

The first barrel chain drive 206 comprises a drive sprocket 212 mounted on the near end of the shaft 214. The shaft 214 extends laterally across the frame 12 to the far side where the far end thereof is provided with a sprocket 216 which is connected by a chain 218 to a sprocket 220 provided on a speed reducer 222. The speed reducer 222 is connected by means of a flexible coupling, not illustrated, to the electric drive motor 224.

The first barrel chain drive 206 further includes an idler sprocket 226 at the end of the frame 12, an upper idler sprocket 228 mounted on a transversely extending counter shaft 230 and a pair of lower idler sprockets 232 and 234 as best illustrated in FIG. 2. An endless link drive chain 236 extends around the drive sprocket 212, upper idler sprocket 230, idler sprocket 228 and the lower idler sprockets 232 and 234 and is effective when energized or driven to rotatably drive the barrels 42 when at certain of the work treating stations as will subsequently appear.

The counter shaft 230 extends across the frame 12 to the far side thereof as illustrated in FIG. 3 and is provided with a drive sprocket 238 which forms the drive member for the second barrel chain drive 208. The second barrel chain drive 208 further includes an idler sprocket 240 at one end thereof, an upper idler sprocket 242 and a lower idler sprocket 244. An endless drive chain such as a link chain 246 extends around the sprockets 238, 240, 242 and 244. Rotation of the drive sprocket 238 by the first barrel drive 206 is effective to rotate and drive the chain 246 and thereby rotatably drive the corresponding barrels 42 at certain of the work treating stations.

The third barrel chain drive 210 is independent of barrel chain drives 206 and 208 and includes a speed reducer 250 having a drive sprocket 252 thereon. The speed reducer 250 is connected to a drive motor 254 by means of a drive chain 256 or by other suitable means well known in the art. The drive sprocket 252 is in turn connected by a chain drive 258 to a sprocket 260. Located at an end of the frame 12 is an idler sprocket 262 and interposed between the sprockets 260 and 262 is a lower sprocket 264. An endless drive chain 266 extends around the sprockets 260, 262 and 264. The chain 266 when energized or driven is effective to rotate the corresponding barrels 42 at the corresponding stations.

Mounted at the near and far sides of the frame 12 on the rail 38 are cam tracks 270 which extend substantially the entire length of the frame 12. Each cam track 270 includes a horizontal portion 272 provided with a series of downwardly inclined transfer cam surfaces 274 and 276 at the majority of the work stations. The V-shaped area between a pair of cam surfaces 274 and 276 is located generally centrally of the corresponding treating station. The cam track 270 is made in sections and secured to rail 38 by welding or by other fastening means such as bolts. The conveyor drive chains 184 and 186 described previously are effective to move the lift arm and barrel assemblies 44 around the periphery of the frame 12 and to transfer such assemblies 44 from station to station. The first, second and third barrel chain drives 206, 208 and 210 are effective to rotate the sprockets 73 provided on the lift arm assemblies 44 and in turn to rotate the corresponding barrels 150 when the arm assemblies 44 are at the bottom of the V-shaped areas between the sloping cam surfaces 274 and 276.

FIG. 1 illustrates a general layout of the processing apparatus 10 and specifically of an automatic barrel machine. The apparatus 10 is provided with twelve work stations including the loading station 20, unloading station 24 and a series of treating stations, each treating station having a treating tank (containing a treating solution) designated by the letters A–I inclusive. Located adjacent to the treating tank I is station J which is hereinafter referred to as the drying station J where the parts in a barrel 150 are dried as best illustrated in FIG. 9. The apparatus 10 as illustrated in FIG. 1 is provided with fifteen lift arm and barrel assemblies 42, one assembly at each of the stations other than station 6 (treating tank E) at any one time. Station 6 is provided with four lift arm and barrel assemblies 42 at any time period.

The following flow and time diagram illustrates the specific function of each of the twelve work stations and also the time required to process a loaded barrel at such stations:

FUNCTION AND TIME DIAGRAM

| Work stations | Designation of station | Functions | Time |
|---|---|---|---|
| 1 | Loading Station 20 [1] | To Load Barrels | Variable. |
| 2 | Tank A | Soak and Clean | 330 seconds. |
| 3 | Tank B | Cold Water Rinse | Do. |
| 4 | Tank C | Acid Bath | Do. |
| 5 | Tank D | Cold Water Rinse | Do. |
| 6 | Tank E | Zinc Plate Bath | 23 Min. & 30 Sec. |
| 7 | Tank F | Cold Water Rinse | 330 Seconds. |
| 8 | Tank G | Chromate Bath | Variable. |
| 9 | Tank H | Cold Water Rinse | 330 Seconds. |
| 10 | Tank I | Hot Water Rinse | Do. |
| 11 | Tank J | Drying | Do. |
| 12 | Unloading Station 24.[1] | To Unload Treated Parts From Barrels. | Variable. |

[1] Automatic.

The function and time diagram illustrated above is typical of one machine incorporating features of the present invention. It should be appreciated that the functions and time cycles may vary from one machine to another.

The apparatus 10 illustrated in the drawings produces ten barrels of work per hour and has a dwell time of five minutes and thirty seconds and a transfer time of thirty seconds as will be understood by a person skilled in the art.

Each lift arm and barrel assembly 44 has three positions including: (a) a loading position and a plating position where the longitudinal axis of the lift arm and barrel assembly 44 is generally horizontal, with the entrance opening 160 of the barrel 150 facing outwardly away from the frame 12, with the loading position illustrated in FIG. 4 and the plating position or operative position illustrated in FIG. 5; (b) a transfer position where the longitudinal axis of the lift arm and barrel assembly 44 is inclined upwardly as illustrated in FIG. 7, with the opening 160 of the barrel 42 facing upwardly and outwardly; and (c) an unloading position as illustrated in FIG. 10, with the longitudinal axis of the lift arm and barrel assembly 44 being inclined downwardly and with the opening 160 of the barrel 42 facing downwardly and outwardly.

The arrangement of the barrels 150 and the corresponding lift arm assemblies on the frame 12 as described heretofore has an important advantage not heretofore utilized in prior art machines in that the entrance openings 160 of the barrels 42 are located on the outer periphery of the apparatus 10 rather than on the inner periphery of the apparatus as illustrated in the aforementioned Barton and Hannon patents, Stated in another way, the entrance openings 160 in barrels 42 face outwardly or in a direction away from the frame 12 to permit more efficient loading, treating and unloading of the parts or pieces in the barrels 150.

The loading station 20 illustrated in FIG. 4 includes a conveyor apparatus 270 which is effective to move relatively small parts or workpieces to be treated from a discharge hopper, not shown, into the barrel or receptacle 150 through the entrance opening 160 provided therein.

A generally U-shaped tank E is provided at the sixth work station which extends around one end of the frame 12 as best illustrated in FIG. 1. Tank E contains, as example, a zinc plating bath in which four barrels 150 are located at any given time as mentioned previously. The upper periphery of the tank E is provided with an overflow trough 273. The trough 273, starting at the center thereof at the place designated by the numeral 274, slopes downwardly in opposite directions indicated by arrows D and D' in FIG. 1 to the low points on the upper periphery of the tank E designated by the numerals 275 and 276. The overflow trough 273, as an example, is two inches deep at point 274 and approximately six and seven inches deep at points 275 and 276 in order to collect and direct treating solutions overflowing from tank E into opposite ends of an overflow tank 280. The trough has a width of approximately eight inches. Tank 280 is located at the back of the rear wall 281 of tank E.

The overflow tank 280 is provided with a centrally located sump 282 having a height equal to the height of the overflow tank 280. The sump 282 extends laterally across the tank 280 and is provided on opposite sides thereof with filter units 284 which filter the treating or plating solution from the tank 280 prior to the solution entering the sump 282 where additional zinc is added to the solution. In order to regulate or control the temperature of the solution in the overflow tank 280, a heating coil or, in other cases, a cooling coil 286 is provided as an optional feature. A centrally located vertically arranged conduit 288 extends upwardly from the overflow sump 282 and is connected on the upper end thereof to a pump 290. The pump 290 is connected to a conduit distribution system 292 which is arranged in the form of a U as best illustrated in FIG. 1 and is mounted on the apparatus spaced above the top of the tank E. The conduit system 292 is provided with four discharge spouts 294, one spout 294 for each of the barrels 150 in the treating tank E. The purpose of the overflow tank 280, sump 282 and the conduit distribution system 292 is to provide a continuous supply of filtered treating solution for the barrels 150, such solution having additional zinc added thereto in the sump 282.

Treating tank F is provided with a delayed set down or quick position device 300 which maintains the barrel 150 in a transfer or raised position for a predetermined period of time when the other barrels 150 on the apparatus are in plating or treating positions. After a predetermined amount of time has elapsed the delayed set down device 300 lowers the barrel into the treating solution in tank F as illustrated in FIGS. 1 and 8.

The delayed set down device 300 includes a housing 302 carried by the frame 12. A vertically movable platform 304 is located in the space generally occupied by the cam area defined by surfaces 274 and 276. The platform 304 is connected to a screw jack 306 having a nut 308 thereon mounted for rotation only. The nut 308 is power driven in rotation, as an example, by a motor, not shown, which is effective to raise or lower the platform 304, and in turn the lift arm and barrel assembly 44 thereon. The delayed set down device 300 is energized automatically according to a predetermined time pattern to transfer the barrel 150 from a raised or transfer position to a treating position and thereafter to the transfer position for movement to the next station.

The drying station J illustrated in FIG. 9 is provided with a drier assembly 310 comprising a body 312 provided with a steam core or cores 314 or other suitable heating means or devices. The front side of the body 312 is provided with a funnel shaped duct 316 which is connected to a fan and blower assembly 318. The assembly 318 is drivenly connected to a motor 321 which is adapted to drive the fan and thereby deliver, as an example, 1300 c.f.m. of heated air. The outlet of the blower assembly 318 is provided with an outlet duct 320. The return side of the body 312 is provided with a return duct 322 having adjacent the entrance opening 324 thereof a pair of roll vanes 326. Duct 322 also includes a pair of roll vanes 328 which are larger than the heretofore mentioned roll vanes 326.

The upper end 330 of the inlet duct 320 is provided with a generally cylindrical transversely extending opening 332. Located in the opening 332 is a generally tubular and reciprocable snorkel or conduit 334. The snorkel 334 is provided on the inner end thereof with a series of openings 336 in the bottom portion thereof. The outer end of the snorkel 334 is provided on the bottom outside surface thereof with a rack 338. A gear or pinion drive 340 is appropriately mounted and is adapted upon rotation thereof to move the snorkel 334 with respect to the barrel 150 at the drying station J.

After a barrel 150 has been moved or indexed to the drying station J, the drier assembly 310 is automatically energized so as to move the snorkel 334 into the opening 160 of the barrel 150. Thereafter the fan and blower assembly 318 pulls the air across the steam or heated coils and directs the heated air into the snorkel 334 via the inlet duct 320. The snorkel 340 directs the heated air downwardly through the openings 336 provided therein directly on and across the workpieces in barrel 150. The fan 318 pulls or sucks the air from the barrel 150 via the return duct 322 as is well known in the art. After the predetermined time sequence has taken place the snorkel 334 is automatically retracted from the barrel 150 and moved to a rear position until the succeeding barrel 150 is indexed to the drying station J.

FIGS. 2 and 10 illustrate the barrel 1150 in the unload position at the unloading station 24. A power operated lift device 350 is provided at the unloading station 24 for lowering and raising the barrel with respect to the rail 38.

The rail 38 is provided with a gap or opening, not illustrated. The power lift device 350 includes a housing 352 having a pair of guide channels. A slide or platform 354 is located in the gap of the guide rail 38 for closing same and is connected by guide means, not shown, to a jack or threaded member 356. A nut 358 is mounted on the jack 356 for rotation only and is driven in rotation by an electric motor 360. Rotation of the motor 360 and the nut 358 is effective to raise or lower the jack and in turn the slide 354 depending on the direction of rotation of the nut 358. The treated or plated parts in the barrel 150 are discharged into a suitable carrier or tote box.

The operation of the apparatus 10 has been already indicated while the various parts were being described. The workpieces or parts are loaded into the receptacle 150 from a conveyor 270 as illustrated in FIG. 4. The drive conveyors 184 and 186 thereafter raise the barrel 150 into a transfer or inclined position or attitude as illustrated, as an example, in FIG. 7 and move the barrel 150 to treating tank A where the barrel 150 is lowered into a generally horizontal treating position or attitude as illustrated in FIG. 5. Thereafter the barrel chain drive 206 engages the sprocket 73 provided on the barrel 150 in tank A and rotates same (and housing 52 of the lift arm assembly 44) in the solution in the treating tank A where the parts are initially cleaned. Upon completion of the requisite time period in tank A, the conveyors 184 and 186 sequentially and intermittently move the barrel 150 through tank B into tank C which is provided with an acid solution. The acid solution dissolves any grease from the surfaces of the workpieces which are undergoing rotation at such station. Upon completion of the requisite time period at tank C the barrel 150 is raised and transferred by conveyors 184 and 186 to tank D which is a cold water rinse station. A spout 362 is located above the tank D and is connected to a supply of cold water under pressure. The spout 362 is located adjacent the entrance opening to the barrel 150 and supplies cold water continuously to the rotating barrel 150 in tank D. Upon completion of the requisite time period at tank D, the barrel 150 is advanced and transferred to tank E where the workpieces in the rotatable barrels 150 are rotated, as an example, in a zinc bath for plating the workpieces. The barrel 150 periodically is advanced along the curved turn-around portion of the rail 38 adjacent the tank E while undergoing continual rotation. A fresh zinc plating solution is continuously pumped into the barrels 150 in tank E as explained previously to improve the plating efficiency. The workpieces in the barrels 150 in tank E are subjected to the action of the electroplating current and plating solution as they pass in the barrels 150 in a generally U-shaped path around rail 38 while undergoing rotation.

Upon completion of the requisite time period in tank E, which is approximately 23½ minutes, the barrel 150 is raised and transferred to tank F which is a cold water rinse. A continuous supply of cold water may be directed into the entrance opening 160 of the barrel 150 via a spout of the type described at tank D and designated by the numeral 362. Upon completion of the aforementioned cold water rinsing cycle, the barrel 150 is moved to tank G which is provided with the delayed action set down device 300 described previously. Tank G contains a chromate bath and the time period in which the workpieces in the rotating barrel 150 are immersed is dependent upon different electroplating factors well known in the art.

Upon completion of the requisite time period in tank G, the barrel 150 is raised and transferred to a cold water rinse in tank H and then sequentially to a hot water rinse in tank I. A spout 364 is located above tank I and is connected to a supply of hot water under pressure for supplying hot water continuously to the rotating barrel 150. Upon completion of the requisite time period in tank I, the barrel is raised and transferred to the drying station J in FIG. 9 where the snorkel 334 is automatically injected into the mouth of the barrel 150 in order to direct hot air across the rotating workpieces as described previously.

Upon completion of the drying cycle, the barrel 150 is transferred to the unloading station 24 where the power operated lift device 350 is operated effective to lower the barrel 150 on platform 354 and discharge the plated workpieces from barrel 150 into any suitable carrier such as a truck or tote box.

It should be appreciated that an electrical cathode rail or bus bar 370 is provided along the straight length of each side of the frame 12 and is adapted to supply current to the electrical contact shoe 104 of each lift arm assembly 44 or the rail 370 may be provided only opposite those plating and treating stations requiring electrification as is well known in the art. The electrical system comprising the cathode track or rail 370, the contact shoes 104 and the other electrical component parts of the lift arm assemblies 44 may be inspected and repaired in certain instances without requiring the complete disassembly of the lift arm assemblies 44 or their removal from the frame 12.

The apparatus or machine 10 is fully automatic. The movements and operations of the barrels 150 are under the control of a completely automatic electrical system, not illustrated. The various mechanical and electrical elements and parts of the apparatus 10 cooperate in time relationship so that such elements and parts operate at predetermined times and produce the predetermined results of lifting the barrel or lift arm assemblies 44 at the proper point, transporting the raised assemblies 44 horizontally a predetermined amount to the next treating stations, lowering the lift arm assemblies 44 to a horizontal attitude at the treating stations, rotating the barrels where required at such treating stations and repeating the aforementioned cycles of operations until each barrel is processed. The electrical circuit may include safety means which is inoperative as long as the various elements and parts of the machine 10 are maintained in properly timed relationship. In that event that any circumstance arises which interferes with the proper timing of the apparatus or machine 10, a safety circuit immediately becomes operative to stop the driving motors and prevent damage to the apparatus 10.

In summary, the present invention has many important and unique features including: (a) the provision of the sump 282, the recirculating pump 290 and distribution piping 292 which pumps fresh solution into the rotating barrels 150 in tank E; (b) the addition of the electric motor powered jack or device 350 which raises and lowers the barrel 150 at the unloading station 24; (c) the design and shape of the processing barrel 150 and the continuous pumping of fresh solution or hot or cold rinse waters into the work being processed in the barrel; (d) the design and function of the lift arm assembly 44 including the cathodic conductor 48 extending through the assembly; (e) an automatic barrel plating and/or processing machine or apparatus 10 which includes barrel chain drives 206, 208 and 210 in order to rotate the barrels 150 at the work stations at various predetermined speeds; and (f) the provision of a lift or set down device 300 at a work station along one side of the apparatus 10. The mounting of the barrel 150 as described herein has increased the plating efficiency, when compared to present barrel plating machines, by at least thirty percent.

Additional metallic content of zinc is added to the solution in the sump 282 whereby only fresh solution is pumped into the barrel 150 for deposit on the workpieces which is cathodic in nature. The gutter 273 slopes toward the sump 282 and tank E overflows around the entire periphery thereof.

Tanks A, B, G, H are P.V.C. lined as is well known in the art. In addition a vent hood is provided around the acid tank C and on any other tanks where required to provide an exhaust exit for the fumes. In addition overflow troughs, not shown, are provided along certain of the tanks as is well known in the art. The solutions in the tanks generally have an upper level an inch or so below top of the tank so that the workpieces in the barrels 150 rotate in solutions.

It should be appreciated that the various drive and conveyor mechanisms including the motors, flexible couplings, link belts, chains, cables, and the like may take different forms or equivalents in order to obtain the desired results.

In addition, the lift arm assemblies 44 are actually moved from a horizontal attitude to a raised attitude by the conveyors 184 and 186 which urges the cams 86 of the assemblies 44 against the cam surfaces 274 and 276 as is obvious to a person skilled in the art.

The two rollers 196 provided on the back of each carriage or bracket 138 tend to prevent twisting of the carriage 138 as it is moved around the endless path by the conveyors 184 and 186.

Another important feature of the present invention is the use of the countershaft drive 230 wherein one drive motor is effective to drive two endless chain drives 206 and 208, one chain drive on each side of the frame 12 is desecribed heretofore.

In certain cases the snorkel 334 will not be utilized. In such instance the outlet duct 320 is provided with a curved end having an opening which faces the opening or mouth 160 of the barrel 150 when in an operative position.

The drawings and the foregoing specification constitute a description of the improved barrel-type processing apparatus in such full, clear, concise and exact terms as to enable any person skilled in the art to practice the invention, the scope of which is indicated by the appended claims.

What we claim as our invention is:

1. A processing apparatus comprising a frame, a plurality of work stations located adjacent said frame, said stations including a loading station, a treating station and an unloading station, a work carrying barrel mounted on said frame, said barrel having an entrance opening in the end remote from said frame, drive means for moving said barrel along said frame through said stations, said barrel having a generally horizontal operative position at said treating station with said opening facing outward from said frame and an inclined transfer position between said stations with said opening facing in a generally upward direction, means for raising said barrel from said operative position to said transfer position during movement of the barrel between said stations, means for rotating said barrel when in said operative position at said treating station, and fluid delivery means for continuously injecting a treating solution into said barrel through said opening when said barrel is in said operative position at said treating station.

2. A processing apparatus comprising an elongated central frame, a plurality of work treating stations located around the periphery of said frame, a loading station, an unloading station, a plurality of work carrying barrels mounted on said frame for guided travel along said frame in a predetermined path through said stations, said barrels each having entrance openings in the ends thereof remote from said frame, means for moving said barrels along frame through said stations, said barrels having a generally horizontal operative position at said loading and treating stations with said openings facing in an outward direction from said frame, an inclined unloading position at said unloading station with said openings facing in a generally downward direction, and an inclined transfer position between said stations with said openings facing in a generally upward direction, means for raising said barrels from said operative position to said transfer position during movement of said barrels between said stations, means for rotating said barrels when in said operative position at said treating stations, and fluid delivery means at one of said treating stations for injecting a treating solution into the corresponding opening in a barrel when in said operative position at said one of said treating stations.

3. The processing apparatus defined in claim 2 wherein said fluid delivery means includes a source of cold water under pressure and conduit means connecting said source to said one treating station.

4. The processing apparatus defined in claim 2 wherein said fluid delivery means includes a source of hot water under pressure and conduit means connecting said source to said one treating station.

5. The processing apparatus defined in claim 2 wherein said fluid delivery means includes an overflow sump for collecting expended treating solution, conduit means interposed between said sump and said one treating station, and a pump interposed in said conduit means.

6. The processing apparatus defined in claim 2 wherein one of said treating stations includes a generally U-shaped tank extending around one end of said central frame, a trough on the upper part of said tank, an overflow tank adjacent a side of said one tank, said trough sloping gradually downwardly in opposite directions towards said overflow tank, to which the ends of said trough are connected, a sump in said overflow tank into which the overflow treating solution drains, a pump connected to the sump, and a delivery conduit connected to said pump, said conduit having one or more discharge spouts located above said U-shaped tank for injecting the treating solution transferred from the sump by the pump and conduit into selected ones of said barrels.

7. The processing apparatus defined in claim 6 wherein said overflow tank is provided with temperature control means for regulating the temperature of the treating solution.

8. The processing apparatus defined in claim 6 wherein filtering means are provided for filtering the treating solution from said overflow tank into said sump.

9. A processing apparatus comprising a frame, a plurality of work stations located adjacent said frame, said stations including a loading station, a treating station and an unloading station, a work carrying barrel mounted on said frame, said barrel having an entrance opening for inserting and removing workpieces, drive means for moving said barrel in a substantially horizontal plane along said frame and through said stations, said barrel being rotatable and vertically movable with respect to said frame between an operative position at said treating station, in which the barrel axis is substantially in said plane, and a transfer position between said stations, in which the barrel axis is at a substantial upward angle to said plane, means for moving said barrel vertically from said operative position to said transfer position during movement of the barrel between said stations, means for rotating said barrel when in said operative position at said treating station, and fluid delivery means at said treating station for continuously injecting fresh treating solution into said barrel through said opening onto such workpieces when said barrel is in said operative position at said treating station.

10. A processing apparatus comprising a frame, a plurality of work station located adjacent said frame, said stations including a loading station, a treating station and an unloading station, a work carrying barrel mounted on said frame, said barrel having an entrance opening in the end remote from said frame, drive means for moving said barrel along said frame through said stations, said barrel having a generally horizontal operative position at said treating station with said opening facing outward from said frame and an inclined transfer position between said stations with said opening facing in a generally upward direction, means for raising said barrel from said operative position to said transfer position during movement of the barrel between said stations, means for rotating said barrel when in said operative position at said treating station, and means for continuously injecting a fluid treating medium into said barrel through said opening when said barrel is in said operative position at said treating station.

11. A processing apparatus comprising an elongated central frame, a plurality of work treating stations located around the periphery of said frame, a loading station, an unloading station, a plurality of work carrying barrels mounted on said frame for guided travel along said frame in a predetermined path through said stations, said barrels each having entrance openings in the ends thereof remote from said frame, means for moving said barrels along said frame through said stations, said barrels having a generally horizontal operative position at said loading and treating stations with said openings facing in an outward direction from said frame, an inclined unloading position at said unloading station with said openings facing in a generally downward direction, and an inclined transfer position between said stations with said openings facing in a generally upward direction, means for raising said barrels from said operative position to said transfer position during movement of said barrels between said stations, means for rotating said barrels when in said operative position at said treating stations, and means at one of said treating stations for injecting a fluid treating medium into the corresponding opening in a barrel when in said operative position at said one of said treating stations.

12. A processing apparatus comprising a frame, a plurality of work stations located adjacent said frame, said stations including a loading station, a treating station and an unloading station, a work carrying barrel mounted on said frame, said barrel having an entrance opening for inserting and removing workpieces, drive means for moving said barrel in a generally horizontal plane along said frame and through said stations, said barrel being rotatable and vertically movable with respect to said frame between a generally horizontal operative position at said treating station to a transfer position in which the barrel axis is at a substantially upward angle to said plane, means for moving said barrel vertically from said operative position to said transfer position during movement of the barrel between said stations, means for rotating said barrel when in said operative position at said treating station, and fluid delivery means at said treating station for continuously injecting a fluid treating medium into said barrel through said opening onto such workpieces when said barrel is in said operative position at said treating station.

References Cited

UNITED STATES PATENTS

| | | | |
|---|---|---|---|
| 2,148,552 | 2/1939 | Hannon | 134—70 XR |
| 2,963,140 | 12/1960 | Barton | 198—19 |
| 3,022,881 | 2/1962 | Harper et al. | 134—83 XR |
| 3,350,224 | 10/1967 | Sadwith | 134—142 XR |

FOREIGN PATENTS 501,230  2/1939  Great Britain.

ROBERT L. BLEUTGE, Primary Examiner

U.S. Cl. X.R.

134—126, 142, 153; 198—19